United States Patent [19]

Liu et al.

[11] Patent Number: 6,080,073
[45] Date of Patent: Jun. 27, 2000

[54] ELECTRIC AUXILIARY APPARATUS FOR BICYCLE

[75] Inventors: Ching-Wen Liu, Changhua; Pai-Hsiang Hsu, Tainan; Yann-Jy Yang, Hsinchu; Caesar Chen, Taipei, all of Taiwan

[73] Assignee: Industrial Technology Research Institute, Hsinchu, Taiwan

[21] Appl. No.: 09/216,739

[22] Filed: Dec. 21, 1998

[51] Int. Cl.[7] ............................... F16H 3/72; B62K 11/00
[52] U.S. Cl. ................................................. 475/4; 180/207
[58] Field of Search ........................... 475/4, 5; 74/665 A, 74/665 C, 665 E; 180/207, 205, 206, 65.2

[56] References Cited

U.S. PATENT DOCUMENTS

| | | | |
|---|---|---|---|
| 2,420,552 | 5/1947 | Morrill | 475/4 |
| 5,341,892 | 8/1994 | Hirose et al. | |
| 5,474,148 | 12/1995 | Takata | 180/207 X |
| 5,749,429 | 5/1998 | Yamauchi et al. | 180/205 |
| 5,829,546 | 11/1998 | Tseng | 180/207 X |
| 5,941,333 | 8/1999 | Sun et al. | 180/206 |

FOREIGN PATENT DOCUMENTS

| | | |
|---|---|---|
| 276299 | 5/1996 | Taiwan . |
| 289327 | 10/1996 | Taiwan . |
| WO 89/08579 | 9/1989 | WIPO ................................... 180/206 |

*Primary Examiner*—Charles A Marmor
*Assistant Examiner*—Roger Pang

[57] ABSTRACT

An electric auxiliary apparatus for a bicycle mainly comprises an electric motor, a gear reduction mechanism, a power combination mechanism, and a pedal force sensing mechanism, wherein the gear reduction mechanism includes a planetary gear assembly, a bevel gear assembly, and two reduction gears; the power combination mechanism comprises two chain-wheel seats, two elastic member seats, two elastic members, and two single-direction clutches, the pedal force sensing mechanism primarily includes a sensing sliding seat, a magnet, a magnetizable member, a restoring spring, and a sensor.

4 Claims, 3 Drawing Sheets

ELECTRIC AUXILIARY APPARATUS FOR BICYCLE

BACKGROUND OF THE INVENTION

1. Field of the Invention

The present invention relates generally to an electric bicycle, and more particularly to an electric auxiliary apparatus for a bicycle.

2. Description of the Related Art

A conventional electric bicycle generally comprises a high speed electric motor used as an auxiliary power source, a gear reduction mechanism for reducing the speed of the electric motor and increasing the output torque from the electric motor, and a power combining mechanism for combining the electric power from the electric motor after speed reduction and the pedaling power from the bracket axle by the rider. The combined driving power drives a chain wheel at the bracket axle for driving the electric bicycle. Accordingly, the force and the power required from the rider for driving the bicycle are relatively reduced. A pedal force sensor is generally provided in a pedal force transmission path to detect the magnitude of the pedal force for controlling the output power from the auxiliary electric motor in accordance with the pedal power.

U.S. Pat. No. 5,341,892 entitled "Motor and Driven Bicycle" discloses a power combination mechanism mainly including bearing-type single-direction clutches, and a pedal force sensing mechanism using a planar cam and a compression spring to create an anal displacement, which, in turn, is detected by an induction coil means for outputting a signal corresponding to the magnitude of the pedal force. R.O.C. Publication No. 289327 discloses an electric bicycle comprising a power combination mechanism primarily consisting of a bearing-type single-direction clutch and a ratchet-wheel type single-direction clutch, and a pedal force sensing mechanism using a planetary gear and a compression spring to create an absolute angular displacement, which, in turn, is detected by a revolving potential meter for outputting a signal corresponding to the magnitude of the pedal force. R.O.C. Publication No. 276299 discloses an electric bicycle comprising a power combination mechanism primarily consisting of two single-direction clutches, and a pedal force sensing mechanism using a torque rod to create a relative angular displacement further amplified by a lever, which, in turn, is detected by a linear potential meter for outputting a signal corresponding to the magnitude of the pedal force.

Generally speaking, the power combination mechanisms of the above conventional electric bicycles utilize a pair of single-direction clutches (i.e., single-direction bearing or ratchet-wheel clutches) to combine the motor power and pedal power. When riding, if the rotational speed of pedaling is higher than that of the motor after gear reduction, the pedal force solely drives the bicycle under the action of the single direction clutch and the inertia of the elements of the motor do not become a burden for pedaling; if the rotational speed of the motor after gear reduction is higher than that of pedaling, the motor power solely drives the bicycle under the action of the single direction clutch and the inertia of the elements of the pedaling mechanism do not become a burden for the electric motor, and if the rotational speed of the motor after gear reduction is synchronized with that of pedaling, the pedal force and the motor power are combined together to drive the bicycle. Therefore, unless the rotational speed of the motor after gear reduction is accurately synchronized with that of pedaling, there is only one power source being utilized for driving the bicycle, thereby resulting in wastage of energy. An additional sensing mechanism for rotational speed and controlling apparatus is required for the power combination mechanisms in order to synchronize the rotational speed of the motor after gear reduction with that of pedaling, thereby resulting in a more complicated structure and higher cost for the power combination mechanisms.

Further, the elements of the pedal force sensing mechanism of the above conventional electric bicycles use a torque rod or a planar cam to transfer the relative angular displacement to an axial displacement which, in turn, is detected in a close-contact sensing means for outputting a signal corresponding to the magnitude of the pedal force. Since the pedal force sensing mechanism is located in the pedal force transmission path, the elements thereof are liable to wear.

The present invention is intended to provide an electric auxiliary apparatus for a bicycle that mitigates and/or obviates the drawbacks of the above conventional electric bicycle.

SUMMARY OF THE INVENTION

The primary object of the present invention is to provide an electric auxiliary apparatus for a bicycle, wherein the energy wasted in the power combination mechanism is significantly reduced.

Another object of the present invention is to provide an electric auxiliary apparatus for a bicycle, wherein the speed of the motor is more accurately synchronized with pedaling.

A further object of the present invention is to provide an electric auxiliary apparatus for a bicycle, wherein the pedal force sensing mechanism is not located in the pedal force transmission path, thereby reducing friction between the elements thereof.

A further object of the present invention to provide an electric auxiliary apparatus for a bicycle, wherein the gear reduction mechanism has advantages of small dimension, high stability, and high efficiency.

In accordance with the present invention, an electric auxiliary apparatus for a bicycle comprises an electric motor, a gear reduction mechanism, a power combination mechanism, and a pedal force sensing mechanism. The gear reduction mechanism includes a planetary gear assembly, a bevel gear assembly, and two reduction gears. The power combination mechanism comprises two chain-wheel seats, two elastic member seats, two elastic members, and two single-direction clutches. The pedal force sensing mechanism primarily includes a sensing sliding seat, a magnet, a magnetizable member, a restoring spring, and a sensor.

The motor power is transmitted into the power combination mechanism through a reduction gear assembly to an elastic member seat by a single-direction clutch used to ensure that power is transmitted in one direction only. The elastic member seat is connected to the chain-wheel seat via an elastic member. In a similar way, the pedal force is transmitted into the power combination mechanism via the crankshaft at the bracket axle, which is connected to the other elastic member seat through the other single-direction clutch which is used to ensure that power is transmitted in one direction only. The elastic member seat is connected to the other chain-wheel seats via the other elastic member. Since these two chain-wheel seat are mounted together by bolts, the motor power and the pedal force can be respectively transmitted into the power transmission system of the bicycle. When the rotational speed of these two elastic member seats is different from that of the reduction gear or the crankshaft, these two elastic members can utilize their elastic restoring force to keep these two single-direction clutches in action at the same time thereby elongating the time that the pedal force and the motor power work together. According to the present invention, the pedal force and the motor power can be transmitted into the power transmission system of the bicycle via the two elastic members, and thus the synchronization between the rotational speed of the motor after gear reduction and that of pedaling is not necessary and the wastage of input energy is avoided.

According to the pedal force sensing mechanism of the present invention, when the pedal force drives the elastic member seat, which, in turn, drives the chain-wheel seat through the elastic member, the magnet on the sensing sliding-seat will move with respect to the magnet (or the magnetizable member) of the chain-wheel seat with a relative angular displacement, thereby changing the relative repulsion and/or attraction area between these two magnets (or the magnet and the magnetizable member) and the total magnetic force therebetween. Accordingly, the sensing sliding-seat slides axially with an axial displacement, which is detected by a sensor for measuring the magnitude of deformation of the elastic member caused by input torque. A restoring spring is used for limiting the displacement range of the sensing sliding-seat and for returning the sensing sliding-seat to its original position. Therefore, since the pedal force sensing mechanism is not located on the pedal force transmission path and the pedal force is detected in a non-contact way, the friction between the elements of the pedal force sensing mechanism is reduced.

The gear reduction mechanism for the present invention transmits the electric motor power into the power combination mechanism via a planetary gear assembly and two reduction gears. The gear reduction mechanism provides the advantages of small dimension, high stability, and high efficiency.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
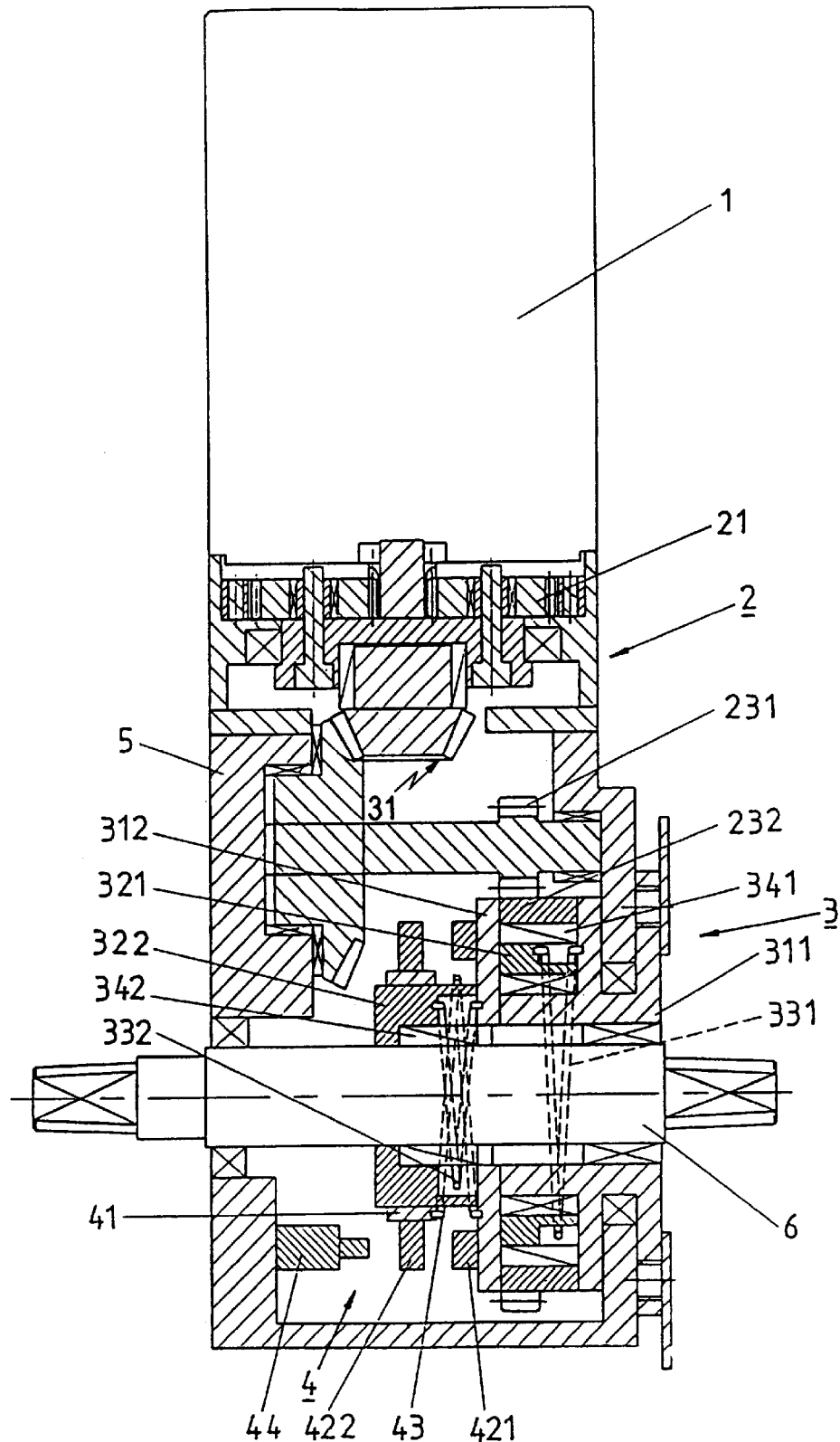
FIG. 1 is a sectional view of an electric auxiliary apparatus according to the present invention.

Referring to FIG. 1, the electric auxiliary apparatus for bicycle 1 in accordance with the present invention mainly includes an electric motor 1, a gear reduction mechanism 2, a power combination mechanism 3, a pedal force sensing mechanism 4, and a casing 5. The gear reduction mechanism 2 primarily includes a planetary gear assembly 21, a bevel gear assembly and reduction gears 231, 232. The power combination mechanism 3 includes a pair of chain-wheel seats 311, 312, a pair of elastic member seats 321, 322, a pair of elastic members 331, 332, and a pair of single-direction clutches 341, 342. The pedal force sensing mechanism 4 primarily includes a sensing sliding-seat 41, a pair of magnets 421, 422, a restoring spring 43, and a sensor 44.

Figure 2:
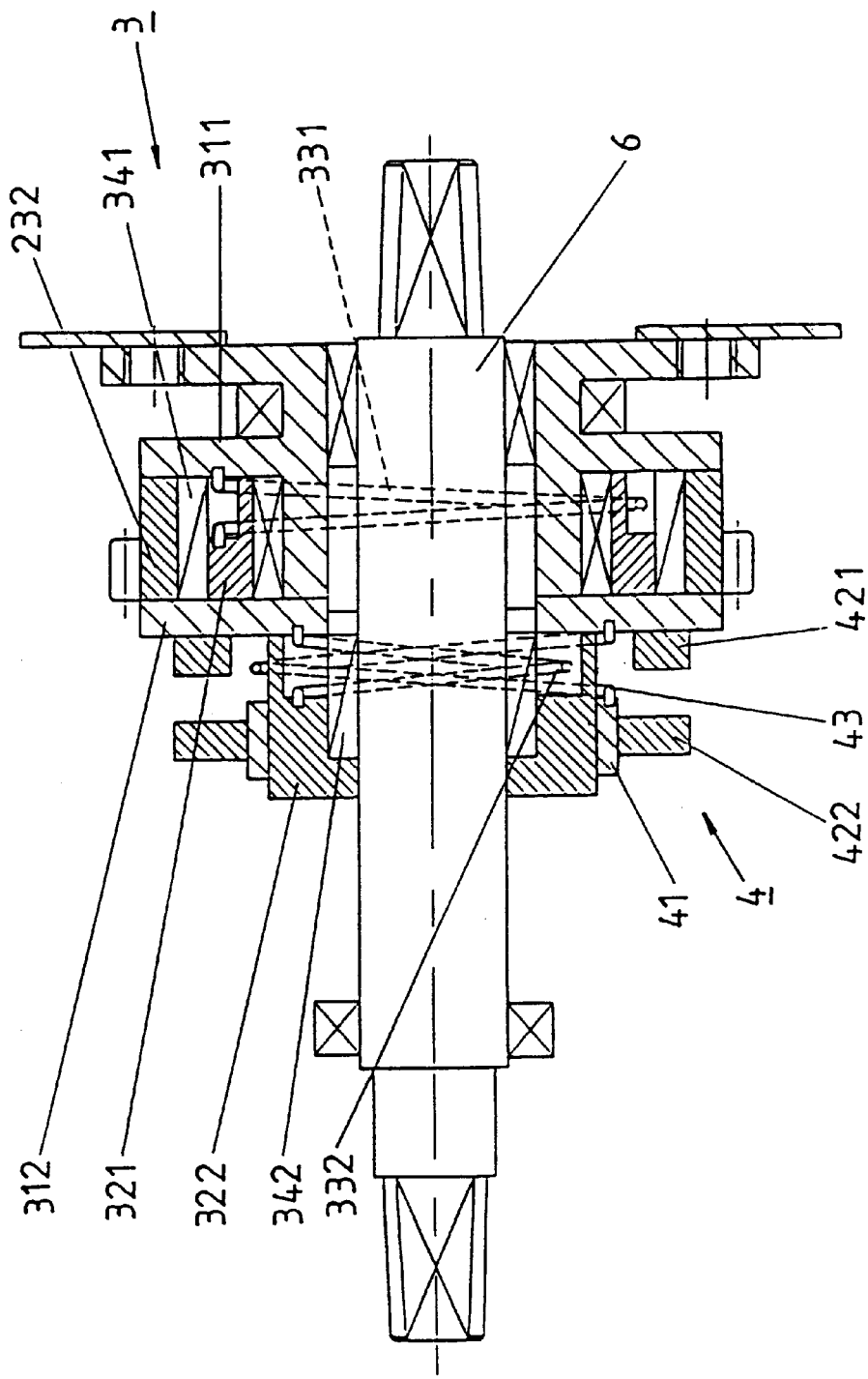
FIG. 2 is a sectional view of the power combining mechanism of FIG. 1

Referring to FIG. 2, illustrating the power combining mechanism 3 of the electric auxiliary apparatus for a bicycle in accordance with the present invention, the power from the electric motor 1 is transmitted into the power combination mechanism 3 via the reduction gear 232 which is connected to the first elastic member seat 321 through the first single direction clutch 341 to ensure that the power is transmitted in one direction only. The first elastic member 331 connects the first elastic member seat 321 to the first chain-wheel link seat 311. In a similar way, the pedal force is transmitted into the power combination mechanism 3 via the crankshaft 6, which is connected to the second elastic member et 322 through the second single-direction a clutch 342 which is used to ensure that the power is transmitted in one direction only. The second elastic member seat 322 is connected to the second chain-wheel seat 312 via the second elastic member 332. Since the second chain-wheel seat 312 and the first chain-wheel seat 311 are mounted together by bolts, the motor power and the pedal force can be transmitted into the power transmission system of the bicycle independently of each other. When the rotational speed of the elastic member seat 321 or 322 is different from that of the reduction gear 232 or crankshaft 6, the elastic members 321, 322 can keep the-two single-direction clutches 341, 342 in action at the same time by their elastic restoring force, thereby elongating the time that the pedal force and the motor power works together. Accordingly, the pedal force and the motor power can be transmitted into the power transmission system of the bicycle via the elastic members 321, 322 independently of each other, whereby the synchronization between the rotational speed of the motor after gear reduction and that of pedaling is not necessary and the wastage of input energy is avoided.

Figure 3:
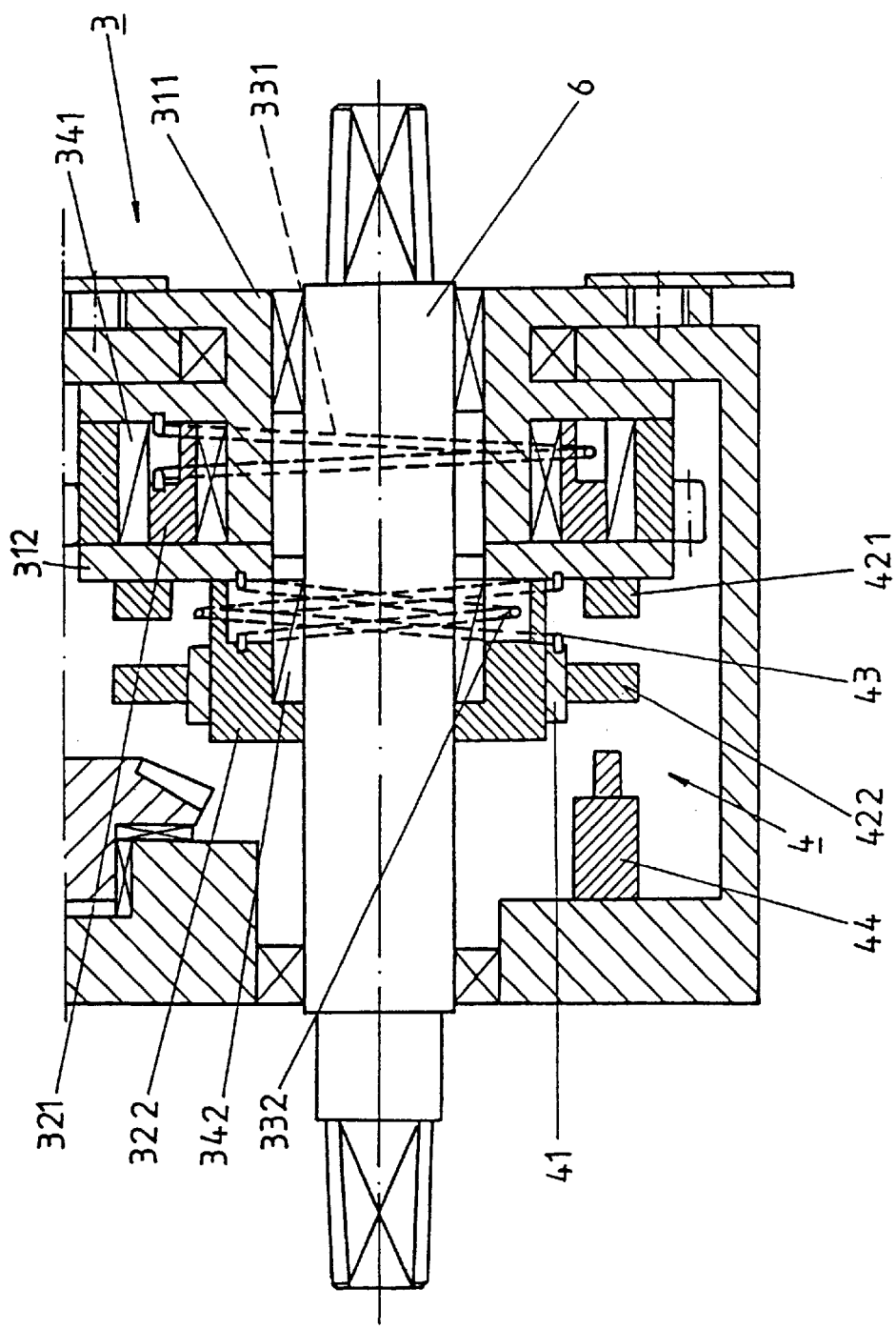
FIG. 3 is a sectional view of the pedal force sensing mechanism of FIG. 1.

Referring to FIG. 3, which illustrates the pedal force sensing mechanism in accordance with the present invention, when the pedal force drives the second elastic member seat 322, which, in turn, drives the second chain-wheel seat 312 via the second elastic member 332, the magnet 421 on the sensing sliding-seat 41 will produce a relative angular displacement with respect to the magnet 422 on the second chain-wheel seat 312, thereby changing the relative repulsion and attraction area between the magnets 421 and 422 to change the total magnetic force between them to make the sensing sliding-seat slide axially. It will be appreciated that, according to the present invention, one of the magnets 421 and 422 may be replaced with a magnetizable member. The relative angular displacement between the magnet and the magnetizable member can change the total magnetic force between them, thereby making the sensing sliding-seat slide axially. The sensor 44 can detect the axial displacement of the sensing sliding-seat 41 and output a signal representing the magnitude of deformation of the second elastic member 332 made by input torque. A restoring spring 43 is used for limiting the displacement range of the sensing sliding-seat 41 and for returning the sensing sliding-seat 41 to its original position. Therefore, the pedal force sensing mechanism is not located on the pedal force transmission path, and the pedal force is detected in a non-contact way, thereby reducing friction between the elements of the pedal force sensing mechanism.

In accordance with the electric auxiliary apparatus for a bicycle of the present invention, the power combination mechanism 3 combines the electric motor power and pedal force to drive the bicycle. In order to avoid the wastage of input energy and to eliminate the necessity of the synchronization between the rotational speed of the motor after gear reduction that of pedaling, the first elastic member 331 is connected to the electric motor 1 and the second elastic member 332 is connected to the input end of pedal force, whereby even though the rotational speed of the electric motor 1 is different from that of pedaling, the elastic members 331 and 332 can keep the single-direction clutches 341 and 342 in action to transmit the pedal force and the motor power into the power transmission system of the bicycle at the same time. The gear reduction mechanism 2 is used for reducing the input speed of the electric motor 1 and increasing the output torque for providing auxiliary power for the bicycle. The first and second elastic members 331 and 332 of the power combination mechanism 3 are connected respectively to the electric motor 1 and the input end of pedal force, and to the output end of the power combination mechanism 3 via the single direction clutches 341 and 342 respectively. The input ratio of electric motor power over pedal force is determined by the different magnitude of the deformation between the first and second elastic members 331 and 332 and the electric motor 1 is controlled by the signal of pedal force feedback from the pedal force sensing mechanism 4.

Referring to FIG. 1 again, the reduction mechanism 2 of the present invention transmits the electric motor power into the power combination mechanism 3 via the planetary gear assembly 21 and the reduction gear 232, which provide the advantages of small dimension, high stability, high efficiency. Since the power combination mechanism 3 of the present invention utilizes a pair of elastic members 331, 332 connected to the electric motor and the crankshaft respectively, when the rotational speed of pedaling is different from that of the motor after gear reduction, these elastic members 331, 332 can use their elastic restoring force to keep the two single-direction clutches in action for transmitting the pedal force and the motor power to the transmission system of the bicycle at the same time. Accordingly, the synchronization between the rotational speed of the motor after gear reduction and that of pedaling is not necessary and wastage of input energy is avoided. The pedal force sensing mechanism 4 is not located on the pedal force transmission path, so the frictional wear to the pedal force sensing elements is eliminated.

Although the invention has been explained in relation to its preferred embodiment, it is to be understood that many other possible modifications and variations can be made without departing form the spirit and scope of the invention as hereinafter claimed.

What is claimed is:

1. An electric auxiliary apparatus for a bicycle, comprising:

an electric motor for providing auxiliary power;

a crankshaft operatively connected to the electric motor;

a first elastic member seat disposed on the crankshaft and driven by an input end of the electric motor;

a first chain-wheel seat disposed on the crankshaft;

a first elastic member connecting the first elastic member seat to the first chain-wheel seat;

an input member for receiving a connected pedal force;

a second elastic member seat disposed on the crankshaft and interlocked with the first chain-wheel seat;

a second chain-wheel seat disposed on the crankshaft and interlocked with the first chain-wheel seat; and second elastic member connecting the second elastic member seat with the second chain-wheel seat;

a gear reduction mechanism for reducing a speed of the auxiliary power from the electric motor and increasing an output torque thereof;

a power combination mechanism for combining the pedal force with the electric motor power to drive the bicycle, the power combination mechanism having said first elastic member connected to the electric motor and said second elastic member connected to the input member; and a pedal force sensing mechanism for detecting the magnitude of the pedal force to control the magnitude of the auxiliary power of the electric motor;

the pedal force sensing mechanism comprising:

at least one magnet located on the second chain-wheel seat; and at least one magnetizable member located on the second elastic member seat;

wherein when the second elastic member deforms, the relative force between the magnet and the magnetizable member changes, thereby causing the second chain-wheel seat to slide along an axle of the crankshaft.

2. The electric auxiliary apparatus for bicycle as claimed in claim 1, wherein the gear reduction mechanism comprises:

a planetary gear assembly rotatably driven by the electric motor;

a bevel gear assembly rotatably driven by the planetary gear assembly; and two reduction gears rotatably driven by the bevel gear assembly and connected to the power combination mechanism;

said reduction gears transmitting the electric motor power into the power combination mechanism.

3. The electric auxiliary apparatus to bicycle as claimed in claim 1, wherein the pedal force sensing mechanism further comprises:

a sensing sliding-seat connected to the second elastic member seat and having the magnet mounted thereon; and a sensor for sensing the magnitude of displacement of the sensing sliding-seat and outputting a signal corresponding to the displacement of the sensing sliding-seat.

4. The electric auxiliary apparatus for a bicycle as claimed in claim 1, wherein the pedal force sensing mechanism further comprises a restoring spring for recovering the position of the sensing sliding-seat.

* * * * *